(12) United States Patent
Hoole et al.

(10) Patent No.: US 8,509,231 B2
(45) Date of Patent: *Aug. 13, 2013

(54) MANAGING COMMUNICATIONS BETWEEN COMPUTING NODES

(75) Inventors: Quinton R. Hoole, Cape Town (SR); Christopher C. Pinkham, Cape Town (SR); Roland Paterson-Jones, Cape Town (SR); Willem R. Van Biljon, Cape Town (SR)

(73) Assignee: Amazon Technologies, Inc., Incline Village, NV (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/859,098

(22) Filed: Aug. 18, 2010

(65) Prior Publication Data

US 2010/0318645 A1 Dec. 16, 2010

Related U.S. Application Data

(63) Continuation of application No. 11/394,595, filed on Mar. 31, 2006, now Pat. No. 7,801,128.

(51) Int. Cl.
*H04L 12/28* (2006.01)

(52) U.S. Cl.
USPC .......................................... 370/389; 709/245

(58) Field of Classification Search
USPC .......................................... 370/389; 709/245
See application file for complete search history.

(56) References Cited

U.S. PATENT DOCUMENTS

| | | | |
|---|---|---|---|
| 6,064,978 A | 5/2000 | Gardner et al. | 705/10 |
| 6,170,012 B1 | 1/2001 | Coss et al. | 709/229 |
| 6,408,336 B1 | 6/2002 | Schneider et al. | 709/229 |
| 6,411,967 B1 | 6/2002 | Van Renesse | 707/201 |
| 6,529,953 B1 | 3/2003 | Van Renesse | 709/223 |
| 6,724,770 B1 | 4/2004 | Van Renesse | 370/432 |
| 7,316,000 B2 | 1/2008 | Poole et al. | 717/104 |

(Continued)

FOREIGN PATENT DOCUMENTS

| JP | 2001-273432 A | 10/2001 |
|---|---|---|
| JP | 2002-49786 A | 2/2002 |

(Continued)

OTHER PUBLICATIONS

"Grid Computing Solutions," Sun Microsystems, Inc., retrieved May 3, 2006, from http://www.sun.com/software/grid, 3 pages.

(Continued)

*Primary Examiner* — Wei Zhao
(74) *Attorney, Agent, or Firm* — Seed IP Law Group PLLC

(57) ABSTRACT

Techniques are described for managing communications between multiple intercommunicating computing nodes, such as multiple virtual machine nodes hosted on one or more physical computing machines or systems. In some situations, users may specify groups of computing nodes and optionally associated access policies for use in the managing of the communications for those groups, such as by specifying which source nodes are allowed to transmit data to particular destinations nodes. In addition, determinations of whether initiated data transmissions from source nodes to destination nodes are authorized may be dynamically negotiated for and recorded for later use in automatically authorizing future such data transmissions without negotiation. This abstract is provided to comply with rules requiring an abstract, and it is submitted with the intention that it will not be used to interpret or limit the scope or meaning of the claims.

46 Claims, 10 Drawing Sheets

(56) References Cited

U.S. PATENT DOCUMENTS

| | | | |
|---|---|---|---|
| 7,801,128 B2* | 9/2010 | Hoole et al. | 370/389 |
| 2002/0112076 A1* | 8/2002 | Rueda et al. | 709/245 |
| 2002/0122420 A1* | 9/2002 | Yuan et al. | 370/389 |
| 2003/0041311 A1* | 2/2003 | Poole et al. | 717/100 |
| 2003/0191695 A1 | 10/2003 | Kondo et al. | 705/26 |
| 2004/0010572 A1 | 1/2004 | Watanabe | 709/220 |
| 2004/0165588 A1 | 8/2004 | Pandya | 370/389 |
| 2007/0169120 A1* | 7/2007 | Schoenberg et al. | 718/1 |

FOREIGN PATENT DOCUMENTS

| | | |
|---|---|---|
| JP | 2002-230344 A | 8/2002 |
| JP | 2002-236839 A | 8/2002 |
| JP | 2002-297924 A | 10/2002 |
| WO | WO 02/099695 A1 | 12/2002 |

OTHER PUBLICATIONS

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved May 3, 2006, from http://www.eweek.com/article2/0,1895,1772626,00.asp, 5 pages.

"Scalable Trust of Next Generation Management (Strongman)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Coulson, D., "Network Security Iptables," Mar. 2003, Linuxpro, Part 1, retrieved from http://davidcoulson.net/writing/lxf/38/iptables.pdf, 4 pages.

Coulson, D., "Network Security Iptables," Apr. 2003, Linuxpro, Part 2, retrieved from http://davidcoulson.net/writing/lxf/39/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

"Global Server Load Balancing with ServerIron," Foundry Networks, retrieved Aug. 30, 2007, from http://www.foundrynet.com/pdf/an-global-server-load-bal.pdf, 7 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

* cited by examiner

FIG. 3A
Group Membership Table

| Node | Group |
|------|-------|
| A | Group1 |
| B | Group2 |
| C | Group2 |
| D | Group3 |
| D | Group4 |
| ... | |

FIG. 3B
Access Rights Table

| Group Name | Allowed Sender | HTTP | FTP | SMTP | ... |
|------------|---------------|------|-----|------|-----|
| Group1 | 0.0.0.0/0 | Yes | No | No | |
| Group2 | Group1 | Yes | No | No | |
| Group2 | Group3 | Yes | No | Yes | |
| Group2 | 196.25.1.23 | Yes | Yes | Yes | |
| Group3 | Group2 | Yes | No | No | |
| Group3 | 196.25.1.23 | Yes | Yes | Yes | |
| ... | | | | | |

Initial condition (no information)

After B sends to D (HTTP) [allow] (example of allowance)

After D sends to A (SMTP) [deny] (example of denial)

After D sends to B (HTTP) [allow] (e.g. allowance the in other direction)

After A sends to B (FTP) [deny] (example of communication on same host)

After B sends to D (FTP) [deny] (different protocol to previously allowed dest)

MANAGING COMMUNICATIONS BETWEEN COMPUTING NODES

CROSS REFERENCE TO RELATED APPLICATIONS

This application is a continuation of U.S. application Ser. No. 11/394,595, filed Mar. 31, 2006 and entitled "Managing Communication Between Computing Nodes," which is hereby incorporated by reference in its entirety. U.S. application Ser. No. 11/394,595 is related to U.S. patent application Ser. No. 11/395,463, filed Mar. 31, 2006 and entitled "Managing Execution Of Programs By Multiple Computing Systems," which is hereby incorporated by reference in its entirety.

TECHNICAL FIELD

The following disclosure relates generally to managing communications between computing nodes, such as to control outgoing transmissions of data to remote destination nodes so as to reflect dynamically determined authorizations for the transmissions.

BACKGROUND

Data centers housing significant numbers of interconnected computing systems have become commonplace, such as private data centers that are operated by and on behalf of a single organization, and public data centers that are operated by entities as businesses that provide access to computing resources to customers under various business models. For example, some public data center operators provide network access, power, and secure installation facilities for hardware owned by various customers, while other public data center operators provide "full service" facilities that also include the actual hardware resources used by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

However, one problem that arises in the context of data centers that virtually or physically host large numbers of applications or systems for a set of diverse customers involves providing network isolation for the systems operated by or on behalf of each customer, such as to allow communications between those systems (if desired by the customer) while restricting undesired communications to those systems from other systems. Traditional firewall technologies may be employed to provide limited benefits, but problems persist. For example, firewalls are typically configured to filter incoming network traffic at or near the destination of the traffic, but this allows malicious applications to cause resource outages by flooding a given network with traffic, even if the firewalls were able to perfectly block all such incoming network traffic. In addition, firewalls do not typically include facilities for dynamically modifying filtering rules to reflect the types of highly dynamic resource provisioning that may occur in the context of a large-scale data center hosting many thousands of virtual machines. Thus, as new applications and systems come online and others go offline, for example, traditional firewalls lack the ability to dynamically determine appropriate filtering rules required to operate correctly, instead necessitating time-consuming and error-prone manual configuration of such filtering rules.

Thus, given such problems, it would be beneficial to provide techniques that allow users to efficiently specify communications policies that are automatically enforced via management of data transmissions for multiple computing nodes, such as for multiple hosted virtual machines operating in one or more data centers or other computing resource facilities.

BRIEF DESCRIPTION OF THE DRAWINGS

FIGS. 3A-3B illustrate examples of using group membership information for managing communications between computing nodes.

DETAILED DESCRIPTION

Figure 1:
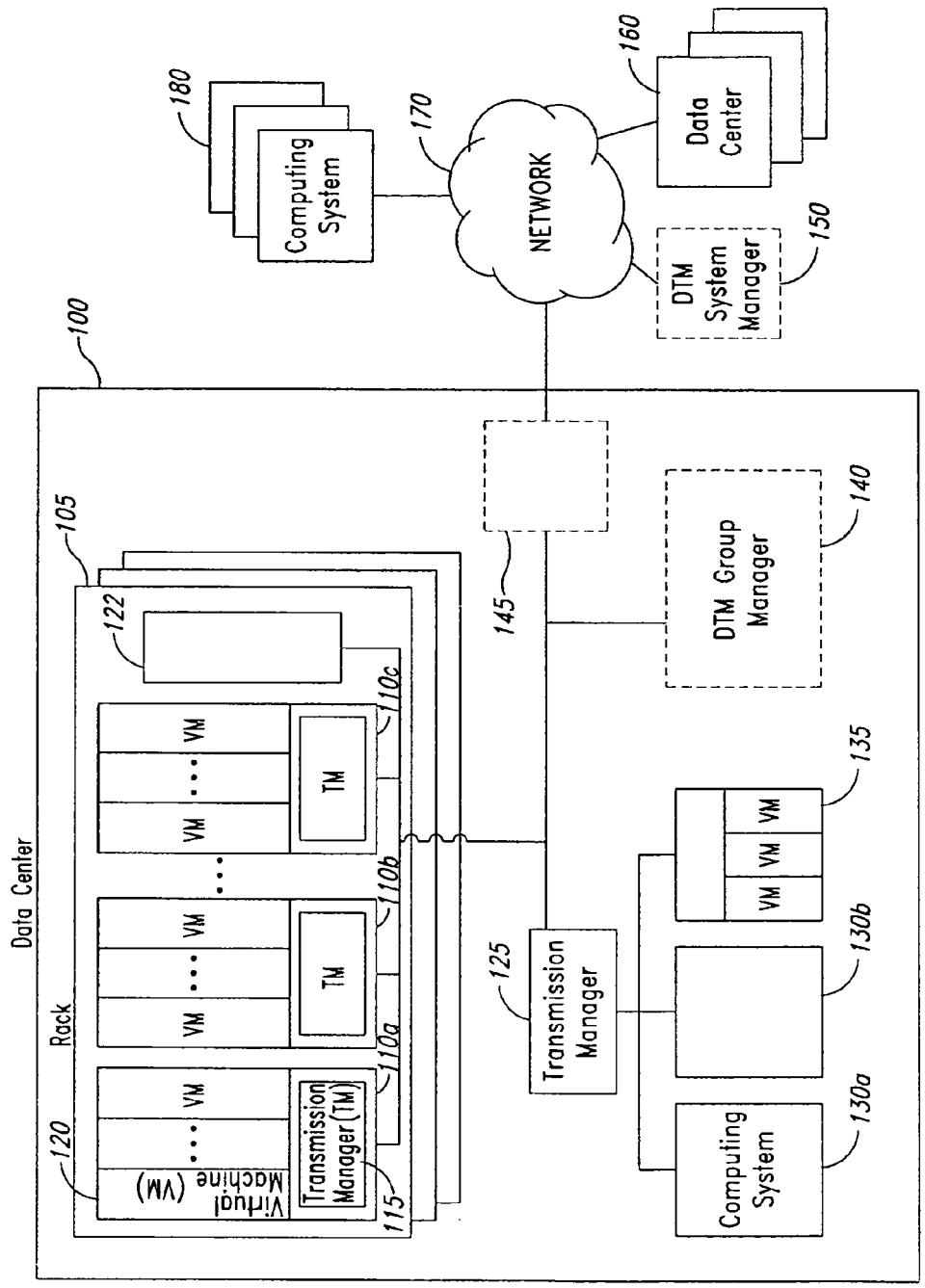
FIG. 1 is a network diagram illustrating an example embodiment in which multiple transmission manager components manage communications between computing nodes.

Techniques are described for managing communications between multiple intercommunicating computing nodes. In some embodiments, the computing nodes include virtual machine nodes that are hosted on one or more physical computing machines or systems, and the communications include transmissions of data (e.g., messages, data packets or frames, etc.) between nodes hosted on distinct physical machines over one or more networks. In addition, in some embodiments the management of a data transmission or other communication between a source node and a destination node is provided by one or more intermediary computing nodes that are capable of identifying and manipulating the communications between the source and destination nodes. For example, in embodiments in which a source node and a destination node are each virtual machines hosted on two distinct physical computing machines, the intermediary computing nodes may include one or more other virtual machines hosted on one or both of the two physical computing machines.

In addition, in at least some embodiments the management of data transmissions includes analyzing outgoing data transmissions that are requested or otherwise initiated from a source node to one or more destination nodes in order to determine whether the data transmissions are authorized, such as under control of an intermediary computing node associated with the source node, and with the data transmissions being allowed to continue over one or more networks to the destination node(s) only if authorization is determined to exist. The determination of authorization by a intermediary computing node may, for example, be based at least in part on defined data transmission policies that specify groups of one or more source nodes that are authorized to communicate with groups of one or more destination nodes, such as when a source node and destination node both belong to a common group of nodes. In addition, an intermediary computing node associated with a source node may communicate with a distinct intermediary computing node associated with an intended destination node in order to negotiate for authorization for a data transmission, and may further store a rule or other indication that reflects the results of the negotiation for use with future data transmissions from the source node to the destination node, such as a transmission management rule that indicates that future such data transmissions are authorized if the negotiation indicates that authorization is provided for the current data transmission.

In some embodiments, an application execution service executes third-party customers' applications using multiple physical machines (e.g., in one or more data centers) that each host multiple virtual machines (which are each able to execute one or more applications for a customer), and the described techniques may be used by one or more data transmission management systems executing as part of the application execution service to control communications to and from the applications of each customer. Customers may provide applications for execution to the execution service, as discussed in greater detail below, and may reserve execution time and other resources on physical or virtual hardware facilities provided by the execution service. In addition, customers may create new groups of computing nodes (e.g., multiple computing nodes that are currently each executing one of multiple instances of a program of the customer), specify access policies for the groups, and have the membership of the groups and/or the specified access policies be updated (whether automatically or manually) to reflect changing conditions, such as to reflect new application instances that are executed, previously executing application instances that are no longer executing, and/or new or adjusted access policies (e.g., to reflect new security requirements, such as by changing whether access to other computing nodes, groups and/or applications is allowed or denied).

In some embodiments, access policies describe source nodes (also referred to as "sending nodes" or "senders") that are allowed to transmit data to a particular destination node or group of nodes, such as by describing such source nodes individually (e.g., via network address or other identifier), via ranges of network addresses or other identifiers, as one or more groups of related source nodes, etc., while in other embodiments access policies may instead in a similar manner describe destination nodes that are allowed to receive data transmissions from one or more particular source nodes or groups of nodes. In the absence of specified access policies and/or the ability to determine that a particular initiated data transmission is authorized, some embodiments may provide default access policies and/or authorization polices, such as to deny all data transmissions unless determined to be authorized, or instead to allow all data transmissions unless determined to not be authorized.

In one example embodiment, multiple data transmission manager components of a Data Transmission Management ("DTM") system work together to manage the data transmissions of a number of intercommunicating participant computing nodes. Initially, when a participant computing node comes online, a data transmission manager component associated with the participant node determines the node's network address (e.g., IP address) or other network location, any groups to which the node belongs, and indications of source nodes that are authorized to transmit data to the node. Later, when the participant node attempts to initiate communication with a remote destination node, the associated data transmission manager component detects the initiated communication, and determines whether authorization for the communication already exists based on obtained authorization for a prior communication from the participant source node to the destination node. If existing authorization is not available, the associated data transmission manager component attempts to negotiate authorization to communicate with the remote destination node, such as by communicating with a remote data transmission manager component associated with the remote destination node (e.g., by sending a negotiation request that triggers the negotiation)—a negotiation request for a data transmission from a participant source node to a destination node may contain information related to the network identity and group membership of the participant source node.

After the remote data transmission manager component associated with the remote destination node receives a negotiation request on behalf of a source node, the component determines whether the source node is authorized to communicate with the remote destination node based on any access and/or transmission policies of the remote destination node (e.g., based on the groups of which the remote destination node is a member). If it is determined that authorization exists, the remote data transmission manager component responds to the negotiation request with a reply indicating that authorization to communicate is provided. The data transmission manager component associated with the participant source node receives this reply, and proceeds to allow data to be transmitted to the remote destination node (whether by transmitting the data on behalf of the participant source node, allowing a data transmission by the participant source node to proceed, etc.). If the reply instead indicates that authorization to communicate has not been obtained, the data transmission manager associated with the participant source node proceeds to prevent the data transmission to the destination node from occurring (whether by dropping or otherwise discarding an intercepted data transmission, by indicating to the participant source node and/or others not to perform any data transmissions to the destination node, etc.). In addition, the data transmission manager component associated with the participant source node may cache or otherwise store the result of the negotiation so that future transmissions do not require the additional step of negotiation, and the data transmission manager component associated with the destination node may similarly cache or otherwise store the result of the negotiation. In this manner, data transmission manager systems dynamically determine whether the associated computing nodes that they manage are authorized to transmit data to various remote destination nodes.

For illustrative purposes, some embodiments are described below in which specific types of management of communications are performed in specific types of situations. These examples are provided for illustrative purposes and are simplified for the sake of brevity, and the inventive techniques can be used in a wide variety of other situations, some of which are discussed below, and the techniques are not limited to use with virtual nodes, with outgoing data transmissions, within one or more data centers, etc.

FIG. 1 is a network diagram illustrating an example embodiment in which multiple Transmission Manager ("TM") components manage communications between computing nodes, with the multiple TM components being part of a Data Transmission Management ("DTM") system managing the data transmissions of various computing nodes located within a data center 100. In this example, data center 100 comprises a number of racks 105, which each include a number of physical computing systems 110a-c and a rack support computing system 122. The computing systems 110a-c each provide one or more virtual machine nodes 120, which each may be employed to provide an independent computing environment to host applications within the data center 100. In addition, the computing systems 110a-c each host a TM component node 115 that manages outgoing data transmissions from other virtual machine nodes 120 hosted on the computing system, as well as incoming data transmissions from other nodes (whether local or remote to the data center 100) to those hosted virtual machine nodes on the computing system. In this example embodiment, the rack support computing system 122 provides utility services for computing systems local to the rack (e.g., data storage services, network proxies, application monitoring and administration, etc.), as well as possibly other computing systems located in the data center, although in other embodiments such rack support computing systems may not be used. The computing systems 110a-c and the rack support computing system 122 of a rack in this example all share a common, high-speed, rack-level network interconnect (e.g., via a shared backplane, one or more hubs and/or switches that are physically local or remote to the particular rack, etc.), not shown.

In addition, the example data center 100 further comprises additional computing systems 130a-b and 135 that are not located on a rack, but share a common network interconnect to a TM component 125 associated with those additional computing systems, although in other embodiments such additional non-rack computing systems may not be present. In this example, computing system 135 also hosts a number of virtual machine nodes, while computing systems 130a-b instead act as a single physical machine node. The TM component 125 similarly manages incoming and outgoing data transmissions for the associated virtual machine nodes hosted on computing system 135 and for computing system nodes 130a-b. An optional computing system 145 is also illustrated at the interconnect between the data center 100 local network and the external network 170, such as may be employed to provide a number of services (e.g., network proxies, the filtering or other management of incoming and/or outgoing data transmissions, etc.), including to manage outgoing data transmissions from some or all nodes internal to the data center 100 to nodes located in additional data centers 160 or other systems 180 external to the data center 100 and/or to manage incoming data transmissions to some or all internal nodes from external nodes. An optional DTM Group Manager component 140 is also illustrated and may provide a number of services to TM components local to the data center 100, such as to maintain global state information for the TM components (e.g., group membership information, access policies, etc.).

The example data center 100 is connected to a number of other computing systems via a network 170 (e.g., the Internet), including additional computing systems 180 that may be operated by the operator of the data center 100 or third parties, additional data centers 160 that also may be operated by the operator of the data center 100 or third parties, and an optional DTM System Manager system 150. In this example, the DTM System Manager 150 may maintain global state information for TM components in a number of data centers, such as the illustrated data center 100 and additional data centers 160. The information maintained and provided by the DTM System Manager may, for example, include group membership information, access policies, etc. Although the example DTM System Manager 150 is depicted as being external to data center 100 in this example embodiment, in other embodiments it may instead be located within data center 100.

Figure 2:
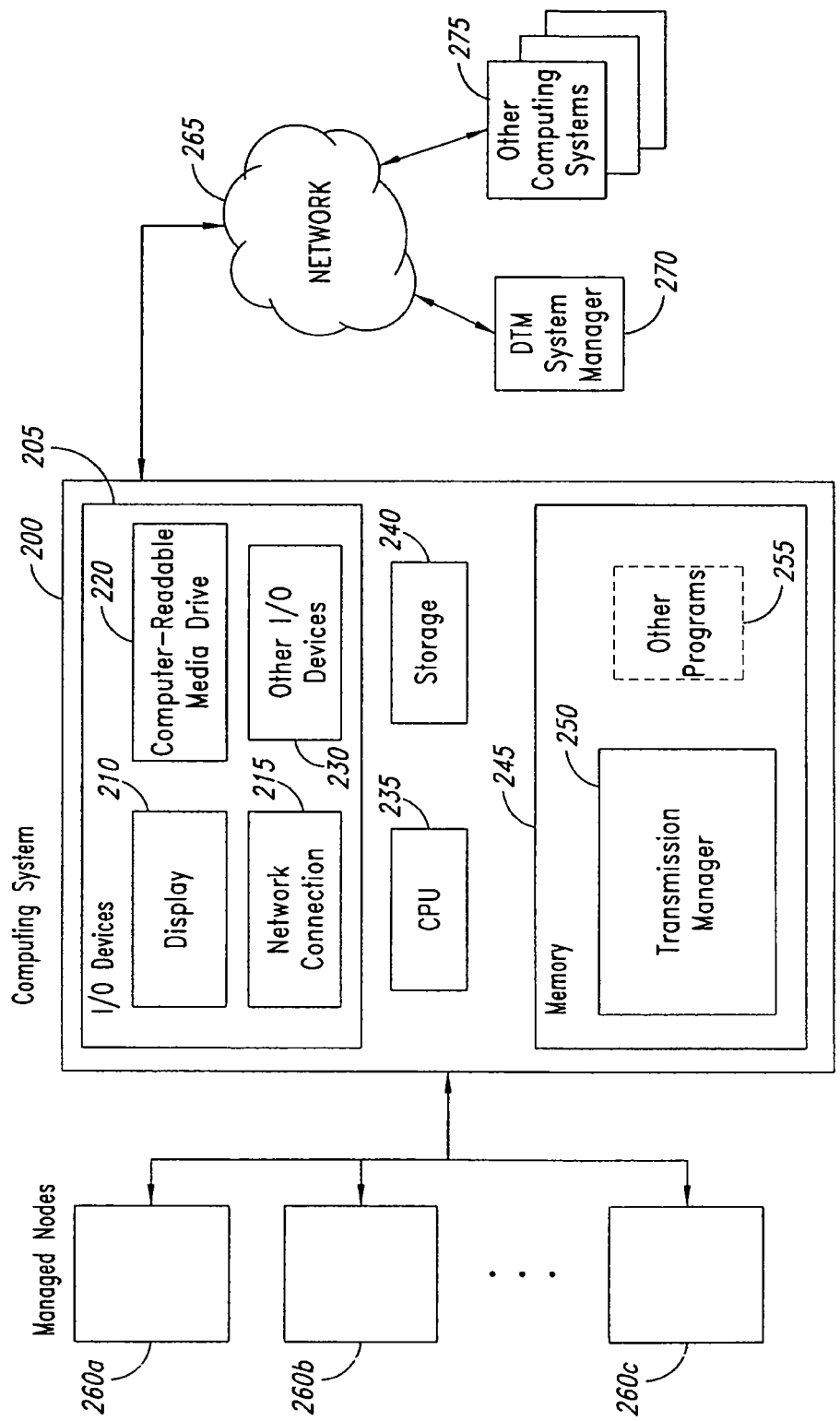
FIG. 2 is a block diagram illustrating an example computing system suitable for executing an embodiment of a system for managing communications between computing nodes.

FIG. 2 is a block diagram illustrating an example computing system suitable for managing communications between computing nodes, such as by executing an embodiment of a TM component. The example computing system 200 includes a central processing unit ("CPU") 235, various input/output ("I/O") devices 205, storage 240, and memory 245, with the I/O devices including a display 210, a network connection 215, a computer-readable media drive 220, and other I/O devices 230.

In the illustrated embodiment, an example TM component 250 is executing in memory 245 in order to manage the data transmissions between associated nodes 260a-c that are being managed and other nodes (such as those represented by the illustrated other computing systems 275 connected via a network 265). In the present example, the managed nodes 260a-c are resident on independent computing systems and are connected to the computing system 200 and TM 250 via a physical network, although in other embodiments one or more of the managed nodes 260a-c may alternatively be hosted on computing system 200 as virtual machine nodes. FIG. 2 further illustrates a DTM System Manager system 270 connected to the computing system 200, such as to maintain and provide information related to the operation of one or more TM components (such as access policies and group membership), as discussed in greater detail elsewhere.

It will be appreciated that computing systems 200, 260a-c, 270 and 275 are merely illustrative and are not intended to limit the scope of the present invention. For example, computing system 200 may be connected to other devices that are not illustrated, including through one or more networks such as the Internet or via the World Wide Web ("Web"). More generally, a "node" or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate intercommunication capabilities. In addition, the functionality provided by the illustrated components and systems may in some embodiments be combined in fewer components or distributed in additional components. Similarly, in some embodiments the functionality of some of the illustrated components may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software components and/or systems may execute in memory on another device and communicate with the illustrated computing system via inter-computer communication. Some or all of the components, systems and data structures may also be stored (e.g., as software instructions or structured data) on a computer-readable medium, such as a hard disk, a memory, a network, or a portable media article to be read by an appropriate drive or via an appropriate connection. The systems, components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIGS. 3A-3B illustrate examples of using group membership information for managing communications between computing nodes. The data illustrated in FIGS. 3A and 3B may be maintained and provided in various manners, such as by the DTM System Manager system 150 shown in FIG. 1 and/or by one or more of various TM components (e.g., in a distributed manner without use of a central system).

FIG. 3A depicts a table 300 that contains membership information for multiple node groups. In particular, each data row 304b-304f describes a membership association between a node denoted in column 302a and a group denoted in column 302b. Thus, for example, rows 304c and 304d indicate that node group Group2 includes at least nodes A and B, and rows 304e and 304f indicate that node D is a member of at least two groups. For illustrative purposes, the nodes in the present example are all indicated by single letters, such as 'A', 'B', 'C', etc., although they could instead be indicated in other ways in other embodiments, such as Internet Protocol ("IP") addresses, DNS domain names, etc. Similarly, groups are indicated in the present example by strings such as "Group1", but various other types of names may be used, and in at least some embodiments users may be able to specify descriptive group names for groups that they use. Column 302c indicates that various types of additional information may be specified and used for groups, such as expiration dates, contact information for the user that created or otherwise manages the group, etc.

FIG. 3B depicts a table 310 that specifies access rights associated with some of the groups indicated in FIG. 3A. In particular, each data row 314b-314g indicates a named sender in column 312b that is authorized to act as a source node to transmit data to any node that is a member of the group named in column 312a. In the present example, such access rights may be specified specific to a particular transmission protocol, with three example protocols shown, those being HTTP 312c, FTP 312d, and Simple Mail Transport Protocol ("SMTP") 312e. In addition, senders may be identified in three different manners in the present example, including by IP address, by IP address range, or by group name, although other naming conventions may be employed in other embodiments (e.g., DNS domain names). For example, row 314b indicates that sending nodes that have IP addresses in the range 0.0.0.0/0 (used here to represent all hosts) may initiate communications using the HTTP protocol to nodes that are members of Group1, but that such sending nodes may not initiate communication to nodes that are members of Group1 using either the FTP or SMTP protocol. Row 314c shows that source nodes that are members of Group1 may initiate communications to nodes that are members of Group2 using the HTTP protocol, but not the FTP or SMTP protocol. Row 314d shows that source nodes that are members of Group3 may initiate communication to nodes that are members of Group2 using the HTTP or SMTP protocols, but not the FTP protocol. Row 314e shows that the single source node with the IP address 196.25.1.23 may initiate communication with member nodes of Group2 using any of the three listed protocols. Subsequent rows 314f-314h contain descriptions of additional access policies. Column 312f indicates that additional information may be specified with respect to access policies (e.g., additional protocols, types of operations, types of data formats, policy expiration criteria such as timeouts, contact information for the user that created or otherwise manages the policy, etc.).

In the example shown in FIG. 3B, access policies may be specified on a per-transmission protocol basis. In the present example, when a source is granted access via a particular protocol, such as HTTP, this may be taken to mean that the sender may send Transmission Control Protocol ("TCP") packets to nodes in the specified group at the default port for HTTP, port 80. Other embodiments may allow access rights to be specified at other levels of details, such as to not indicate particular protocols, or to further specify particular ports for use with particular protocols. For example, some embodiments may allow access rights to more generally be specified with respect to any transmission properties of particular network transmissions, such as types of packets within particular protocols (e.g., TCP SYN packets, broadcast packets, multicast packets, TCP flags generally, etc.), connection limits (e.g., maximum number of concurrent connections permitted), packet size, packet arrival or departure time, packet time-to-live, packet payload contents (e.g., packets containing particular strings), etc. In addition, other embodiments may specify access policies in various manners. For example, some embodiments may provide for the specification of negative access policies, such as ones that specify that all nodes except for the specified senders have certain access rights. Also, different embodiments may provide varying semantics for default (unlisted) access policies. For example, some embodiments may provide a default policy that no sender may communicate with nodes of a given group unless authorized by a particular other policy, with other embodiments may provide a default policy that senders operated by a given user may by default communicate with any other nodes operated by the same user, or that nodes in a given group may by default communicate with other nodes in the same group. Finally, various embodiments may specify groups and group membership in various ways, such as by providing for hierarchies of groups or to allow for groups to be members of other groups, such that a policy would apply to any node below an indicated point in the hierarchy or to any node that is a member of a indicated group or of any sub-groups of the indicated group.

FIGS. 4A-4F illustrate examples of dynamically modified transmission management rules used for managing communications between computing nodes. In the example embodiment, the transmission management rules are used by a given TM component to make decisions about whether to authorize or not authorize data transmissions by one or more associated nodes that are managed by the TM component, with each TM component maintaining its own set of rules. In other embodiments, the rules shown in FIGS. 4A-4F could alternatively be maintained by the DTM Group Manager component 140 of FIG. 1, the DTM System Manager system 150 of FIG. 1, or one or more other components that provide shared access to one or more TM components.

In the example illustrated in FIGS. 4A-4F, two example TM components DTM1 and DTM2 dynamically generate and modify transmission management rules over time based on initiated data transmissions, with DTM1 managing two associated nodes A and B and with DTM2 managing associated node D. Both example DTMs also maintain information related to the group memberships of nodes being managed, as well as to associated access policies for the groups. In the present example, node A belongs to Group1, node B belongs to Group2, and node D belongs to Group3 and Group4, as shown in rows 304b-e in FIG. 3A. The DTMs may obtain information about group membership and access policies in various ways. For example, when a new node to be managed by a particular DTM comes online, the DTM may be notified of this new node and its network address (e.g. IP address), and the DTM may be able to access the group membership and access policy information for the new node (e.g., by querying and/or being notified by the DTM Group Manager component 140 or the DTM System Manager system 150, by retrieving the information from a network-accessible data store, etc.). In addition, changes related to group membership (e.g., a particular existing node is added to or removed from a group) and access policies (e.g., the access policies related to a particular group are modified, such as to now allow data transmissions from another group that previously did not have such authorization) may be communicated to DTMs in a variety of ways. In some embodiments, only the DTMs that are managing nodes affected by a particular change will be notified, such as via information sent from, for example, a DTM Group Manager component and/or a DTM System Manager system. In other embodiments, such changes may be broadcast to all DTMs, or instead all DTMs may be configured to periodically poll an appropriate component in order to obtain updates related to such state changes.

Figure 4A:
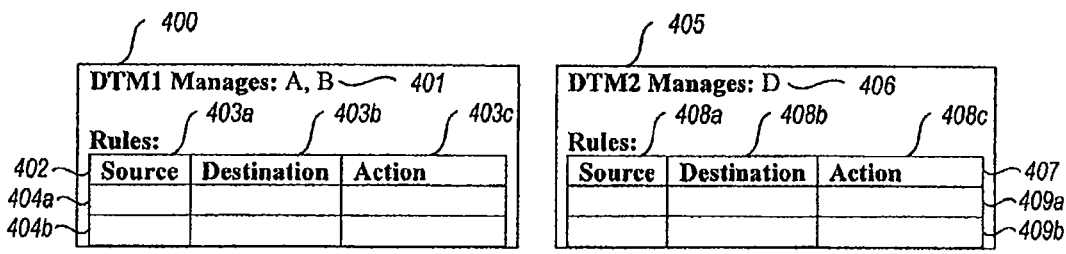
FIGS. 4A-4F illustrate examples of dynamically modified transmission management rules used for managing communications between computing nodes.

FIG. 4A illustrates initial conditions for DTM1 and DTM2 before any of the three nodes have initiated any communications with other nodes. Table 400 represents the transmission management rule set and other information maintained by DTM1. Row 401 lists the nodes that are currently managed by DTM1, in this case nodes A and B. Table 400 further includes a sub-table 402 that shows the transmission management rules maintained by DTM1. Each row 404a-404b can hold a transmission management rule that describes a transmission policy with respect to a node, with each rule specifying a source 403a, a destination 403b, and an action 403c. Because no nodes have initiated communication at this point, the rule set shown is empty, although in some embodiments a low priority default rule may be included (e.g., if no other rules apply, deny an initiated data transmission). Similarly, Table 405 shows the transmission management rules maintained by DTM2. Row 406 shows that DTM2 manages a single node, D. In addition, sub-table 407 shows an empty transmission management rule set, because node D has yet to initiate any communication.

Figure 4B:
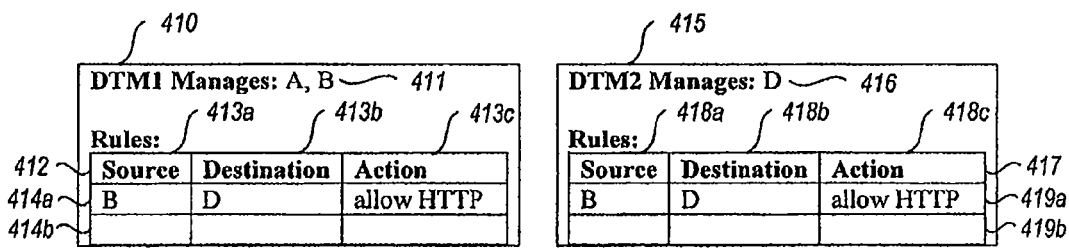

FIG. 4B shows the state of the rule sets after node B has initiated communication with node D via the HTTP protocol. When node B attempts to begin to transmit data to node D, DTM1 first inspects its rule set to determine whether there are any existing rules that govern data transmissions from node B to node D. Finding none, DTM1 negotiates with DTM2 to determine whether node B is authorized to transmit data to node D, and as part of the negotiation DTM1 informs DTM2 that node B has attempted to transmit data to node D via HTTP and that node B is a member of Group2. In some embodiments, such a negotiation involves DTM1 generating and transmitting a negotiation message to destination node D, with the expectation that node D's DTM (whose identity and network address may be unknown to DTM1) will intercept and respond to the negotiation message in an appropriate manner. As described above, DTM2 knows that node D is a member of groups Group3 and Group4, as shown in rows 304e and 304f of FIG. 3A, and that Group3 has allowed members of Group2 to initiate communications via the HTTP protocol, as shown in row 314f of FIG. 3B. Because the desired communication is allowed by the stated access policies, DTM2 responds to the negotiation request by sending a response that indicates authorization for node B to communicate with node D to DTM1. DTM2 further stores a transmission management rule in row 419a that allows HTTP communication from source node B to destination node D. After DTM1 receives the response indicating authorization from DTM2, it also stores a transmission management rule in row 414a that allows HTTP communication from source node B to destination node D. In the present example, because the two DTMs have negotiated and stored rules granting authorization for node B to transmit data to node D via HTTP, future data transmissions from node B to node D using the same protocol will not necessitate the re-negotiation of authorization. In addition, while not illustrated here, in some embodiments the DTM components will also automatically authorize at least some data transmissions from node D to node B (e.g., to authorize replies from node D to data transmissions to node D from node B), whether by adding corresponding transmission management rules or by otherwise authorizing such data transmissions.

In some embodiments, any data destined for node D that was received from node B by DTM1 before the negotiation completed would have been queued by DTM1 until it was determined whether or not node B was authorized to transmit data to node D. In such embodiments, after having received an indication of authorization to communicate with node B, DTM1 would then transmit any queued data to node D, as well as any data that arrived subsequent to the negotiation. In other embodiments, any data destined for node D that was received from node B by DTM1 prior to the completion of the negotiation would instead be discarded by DTM1. Such techniques may be appropriate in situations in which some data transmission loss is acceptable or in which a sending node will resend any data transmissions that are not received and acknowledged by the intended recipient. For example, many transmission protocols will retransmit any lost packets (e.g., based on the timeout and retransmission mechanisms of TCP), and while such a discard-based approach may result in the initial loss of some packets that should ultimately have been delivered (e.g., in the case of a successful negotiation) in this situation, the retransmission will ensure that those initial packets will be resent. Alternatively, in some embodiments before a negotiation is completed or authorization is otherwise obtained for node B to transmit data to node D, the data transmissions could be sent toward node D and be queued at DTM2 (e.g., after being intercepted by DTM2) until authorization is obtained or DTM2 otherwise determines to forward the queued data transmissions to node D (or to discard the data transmission if authorization is ultimately not obtained).

Figure 4C:
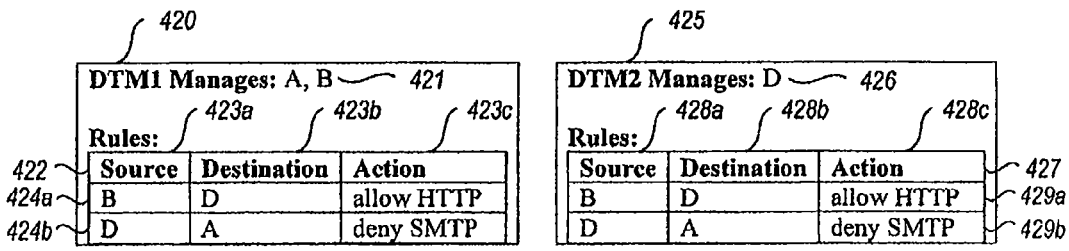

FIG. 4C shows the state of the rule sets after node D has initiated communication with node A via the SMTP protocol. When node D attempts to begin to transmit data to node A, DTM2 first inspects its rule set to determine whether there are any existing rules that govern data transmissions from node D to node A. Finding none, DTM2 negotiates with DTM1 to determine whether node D is authorized to transmit data to node A using the given protocol. DTM2 informs DTM1 that node D is a member of Group3 and Group4 as shown in 304*e* and 304*f* in FIG. 3A, and that node D has attempted to communicate with node A via SMTP. DTM1 knows that node A is a member of Group1 as shown in row 304*b* in FIG. 3A and that Group1 has granted access to all hosts to communicate with it via HTTP, but not SMTP, as shown in row 314*b* of FIG. 3B. Because no host is allowed to transmit data to node A using the SMTP protocol, DTM1 responds to the negotiation request by sending a response to DTM2 that indicates a denial of authorization for node D to communicate with node A via the SMTP protocol. DTM1 further stores a transmission management rule in row 424*b* that denies SMTP communication from source node D to destination node A. After DTM2 receives the response indicating a denial of authorization from DTM1, it also stores a transmission management rule in row 429*b* that denies authorization for future SMTP communications from source node D to destination node A. Again, any data that node D attempted to transmit to node A prior to the completion of the negotiation would have been queued by DTM2 in at least some embodiments. Upon completion of the negotiation process, DTM2 would then drop any queued and all future data sent by node D to node A via the SMTP protocol.

Figure 4D:
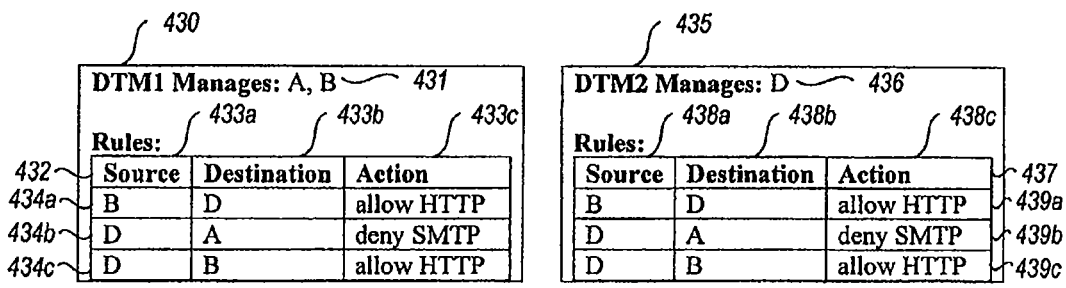

FIG. 4D shows the state of the rule sets after node D has attempted to initiate communication with node B via the HTTP protocol. In effect, the situation described with reference to this figure is the reverse case of the situation described with reference to FIG. 4B, above. An inspection of the tables shown in FIGS. 3A and 3B shows that this communication is authorized, because node B belongs to Group2 (FIG. 3A, row 304*c*), Group2 has granted authorization to members of Group3 to transmit data via the HTTP protocol (FIG. 3B, row 314*d*), and node D is a member of Group3 (FIG. 3A, row 304*e*). Therefore, DTM2 will successfully negotiate authorization for node D to transmit data to node B via HTTP, the applicable rule will be added by DTM2 in row 439*c* and by DTM1 in row 434*c*, and data sent from node D via the HTTP protocol to node B will be forwarded by DTM2. Note also that in this example that node D is permitted to transmit data to node B via multiple protocols (e.g., both HTTP and SMTP). Some embodiments may perform an optimization in such cases by responding to a negotiation request regarding a particular transmission protocol with a response that indicates all of the transmission protocols that the sending node is authorized to use to communicate with the destination node (as opposed to only the requested protocol), such as to in this example cause additional rules to be added for DTM1 and DTM2 to indicate that node D is authorized to send SMTP communications to node B. Such an optimization eliminates the need to perform additional later negotiations with respect to the other authorized protocols.

Figure 4E:
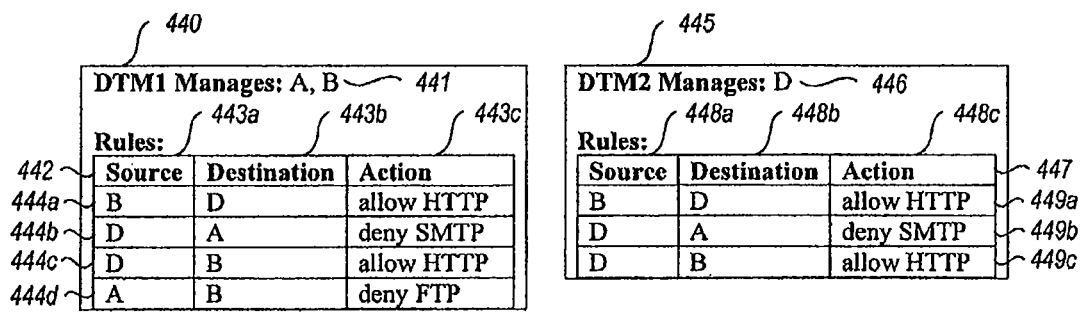

FIG. 4E shows the state of the rule sets after node A has attempted to initiate communication with node B via the FTP protocol. In this case, the source and destination nodes are both managed by the same DTM, and in some embodiments DTM1 may not manage such data transmissions, although in the illustrated embodiment such data transmissions are managed (although DTM1 does not have to negotiate with a remote DTM in this case). An inspection of the tables shown in FIGS. 3A and 3B shows that this communication is not authorized, because node B belongs to Group2 (FIG. 3A, row 304*c*), node A belongs to Group1 (FIG. 3A, row 304*b*), but Group2 has not granted authorization for members of Group1 to transmit data via the FTP protocol (FIG. 3B, row 314*c*). DTM1 therefore adds the applicable rule to row 444*d* and drops any data transmitted from node A to node B using the FTP protocol.

Figure 4F:
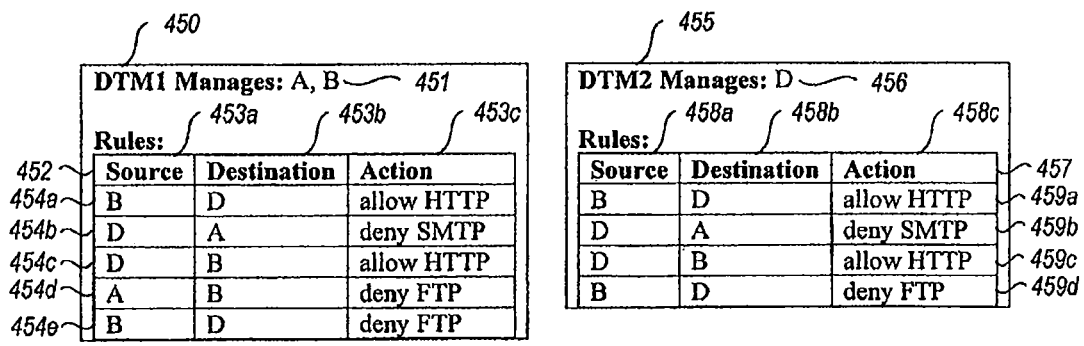

FIG. 4F shows the state of the rule sets after node B has attempted to initiate communication with node D via the FTP protocol. This figure shows an example of an attempt by a source node to transmit data to a previously allowed destination node, but using a different protocol. An inspection of the tables shown in FIGS. 3A and 3B shows that this communication is not authorized, because node B belongs to Group2 (FIG. 3A, row 304*c*), node D belongs to Group3 (FIG. 3A, row 304*e*) but Group3 has not granted authorization to members of Group2 to transmit data via the FTP protocol (FIG. 3B, row 314*f*). Therefore, DTM1 will not be successful in negotiating authorization for node B to transmit data to node D via FTTP and the applicable rule will be added by DTM1 in row 454*e* and by DTM2 in row 459*d*. In addition, DTM1 will drop any data transmitted from node B to node D using the FTP protocol.

Thus, in the manner indicated, the transmission manager components may dynamically create transmission management rules based on managing initiated data transmissions. While not illustrated here, in other embodiments the rule sets for a transmission manager component and/or for a particular node may be modified in other manners, such as to remove all rules corresponding to a node after its associated group membership or other relevant information changes (e.g., after a program being executed on behalf of a first customer on a virtual machine node is terminated) so that the node (or another node that is later allocated the same relevant information, such as the same network address as was previously used by the node) will need to re-negotiate to determine appropriate authorizations, or instead to remove only rules that are affected by a particular change. For example, if the access policies for group3 are dynamically changed at the current time so that group2 no longer is authorized to sent HTTP communications to group3, node B (of group2) will no longer be authorized to send HTTP transmissions to node D (of group3). Accordingly, rule 454*a* for DTM1 and rule 459*a* for DTM2 are no longer valid, and the change to the access policy will prompt those two rules to be removed, but other rules involving nodes B and D (e.g., rules 454*e* and 459*d* for DTM1 and DTM2, respectively) may be maintained in at least some embodiments.

Figure 5:
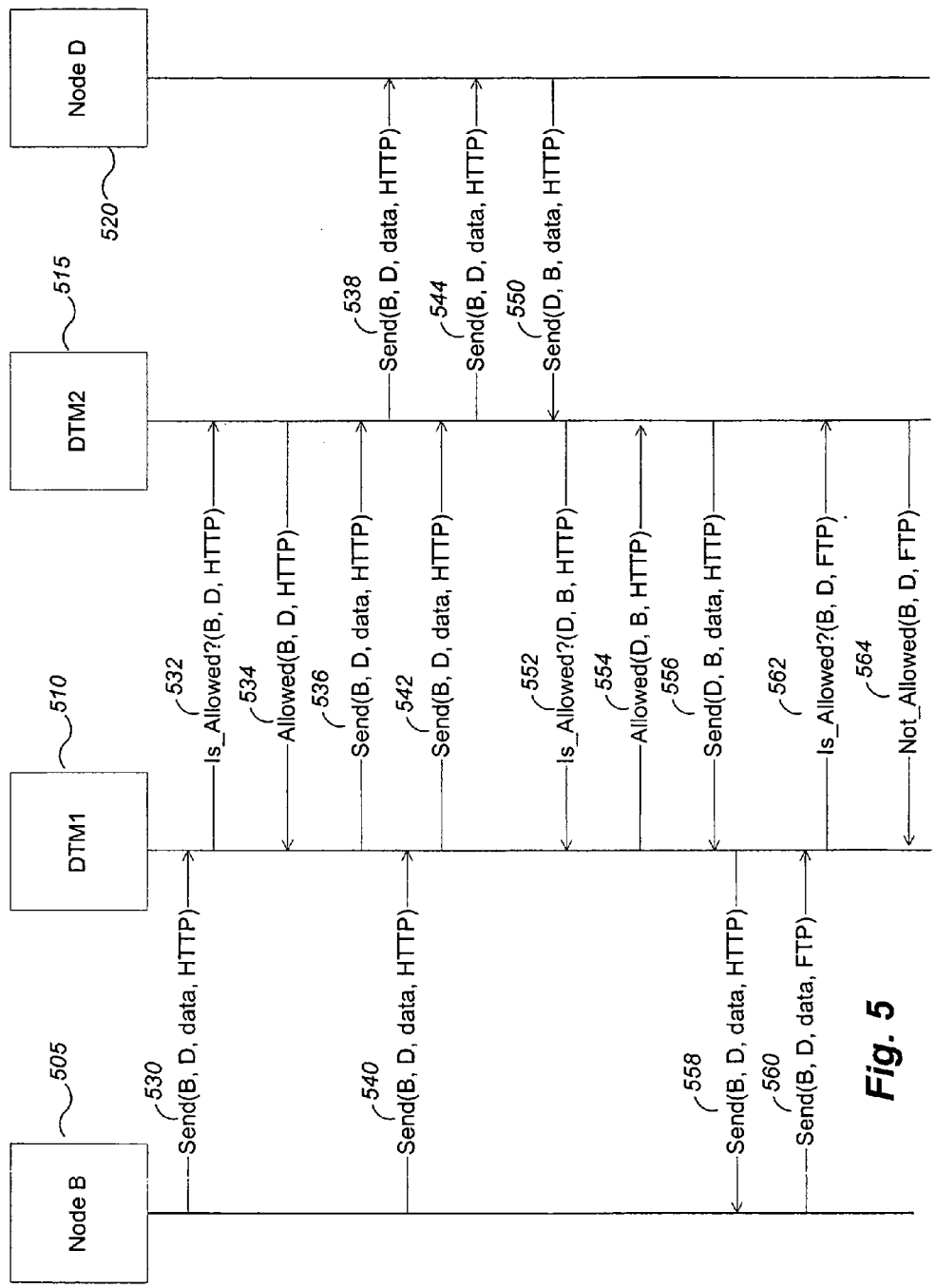
FIG. 5 illustrates examples of data transmissions between two intercommunicating computing nodes and associated transmission manager components that manage the communications.

FIG. 5 illustrates examples of data transmissions between two intercommunicating computing nodes and associated transmission manager components that manage the communications, with the data transmissions shown in a time-based order (with time proceeding downwards). The message names and message contents in this example are illustrative of messages that may be passed between DTM 1 and DTM 2 while managing nodes B and D, although other message passing or other interaction schemes are possible in other embodiments. In addition, in some embodiments the initiation of a data transmission and the corresponding protocol being used may be determined by inspecting underlying data and/or control packets that are detected (e.g., TCP packets, User Datagram Protocol ("UDP") packets, etc.). In particular, FIG. 5 shows an example of messages passed between nodes and DTMs during a successful negotiation as described with reference to FIG. 4B. Initially, node B 505 attempts to send data via the HTTP protocol to node D 520 by transmitting a Send message 530. DTM1 510 receives this message and takes it as an indication that node B is attempting to transmit data to node D. At this point, DTM1 has no rules governing such transmissions, so it attempts to negotiate permission with DTM2 515. In this example it does so by sending an Is_Allowed? message 532 that is received by DTM2, although in at least some embodiments the message 532 is addressed to remote destination node D but intercepted by the DTM that manages the data transmissions for that remote node, as discussed in greater detail elsewhere (in this way, a sending DTM may operate without knowledge of the network location of the remote DTM). DTM2 determines by inspection of the appropriate data that node D has authorized such transmissions, and therefore sends an Allowed message 534 that is received by DTM1. Having received authorization to transmit, in the illustrated embodiment DTM1 transmits the data queued from the Send message 530 in a second Send message 536 to node D that is again received by DTM2, who forwards this data via Send message 538 to its final destination of node D 520. As previously noted, in other embodiments DMT1 may not queue the Send message 530 while performing the negotiation, and thus would not transmit the Send message 536 in this example. Subsequent to the negotiation, node B attempts to transmit more data to node D by sending a Send message 540. Since DTM1 has previously negotiated authorization for this type of data transmission, it forwards the data via Send message 542 without additional negotiation. DTM2 receives Send message 542 and similarly forwards the data to node D via Send message 544.

Next, FIG. 5 shows an example of messages passed between nodes and DTMs during a successful negotiation as described with reference to FIG. 4D. Initially, node D attempts to transmit data to node B via HTTP by way of the Send message 550. If the data transmission is related to the prior authorized data transmissions from node B to node D using HTTP (e.g., is a reply to received Send message 544 or otherwise is part of the same session), DTM1 and DTM2 will in some embodiments automatically have authorized such reply data transmissions as part of the prior negotiation process, as discussed in greater detail elsewhere—this ability to automatic authorize such replies may provide various benefits, such as to enable some types of transmission protocols (e.g., TCP) to function effectively. In this example, however, DTM2 instead initiates a separate authorization negotiation for the data transmission with the Is_Allowed? message 552. DTM1 determines by inspection of the appropriate data that node B has authorized such transmissions, and therefore responds with an Allowed message 554. Finally, DTM2 forwards the queued data from Send message 550 by way of a new Send message 556, which DTM1 forwards to its ultimate destination by way of Send message 558. Finally, FIG. 5 shows an example of messages passed between nodes and DTMs during a negotiation that results in a denial of authorization as described with reference to FIG. 4F. Initially, node B attempts to transmit data to node D via FTP by way of the Send message 560. DTM1 initiates negotiation with DTM2 via the Is_Allowed? message 562. DTM2 determines by inspection of the appropriate data that node D has not authorized such transmissions, and therefore responds with a Not Allowed message 564. In response, DTM1 drops the data received by way of the Send message 560.

Figure 6:
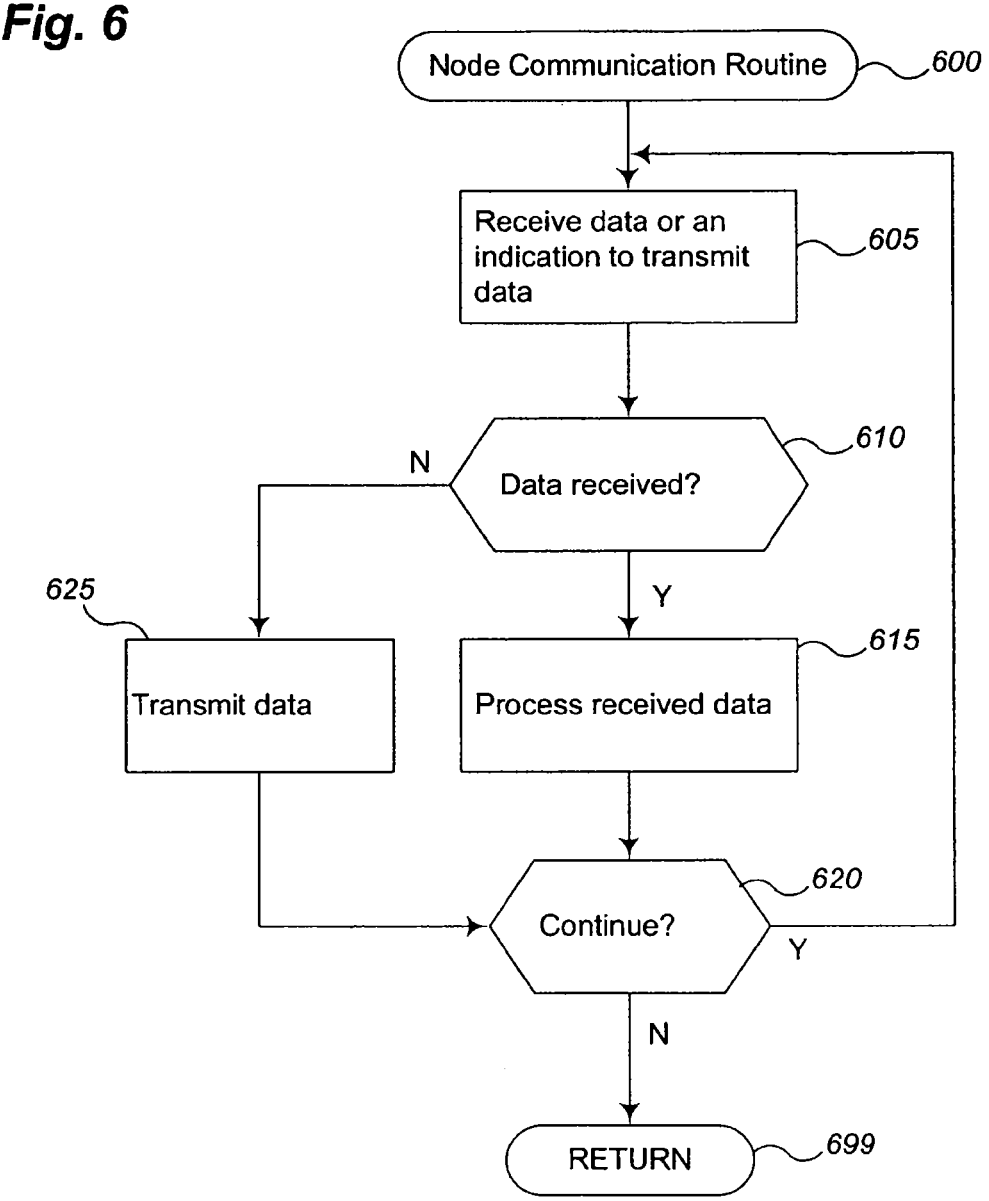
FIG. 6 illustrates a flow diagram of an example embodiment of a Node Communication routine.

FIG. 6 illustrates a flow diagram of an example embodiment of a Node Communication routine 600. The routine may be performed as part of the actions of a communicating node, such as virtual machine node 120 or computing system node 130a shown in FIG. 1.

The routine begins in step 605, where it receives data sent from another node or an indication to transmit data to a remote node (e.g., from another part of the actions of the node). In step 610, the routine determines whether data was received from another node. If so, it proceeds to step 615 and processes the received data. If it was instead determined in step 610 that an indication to transmit data was received, the routine proceeds to step 625 and transmits data to the appropriate destination. After step 625 or 615 the routine proceeds to step 620 to determine whether to continue. If so, the routine returns to step 605, and if not continues to step 699 and ends.

Figure 7A:
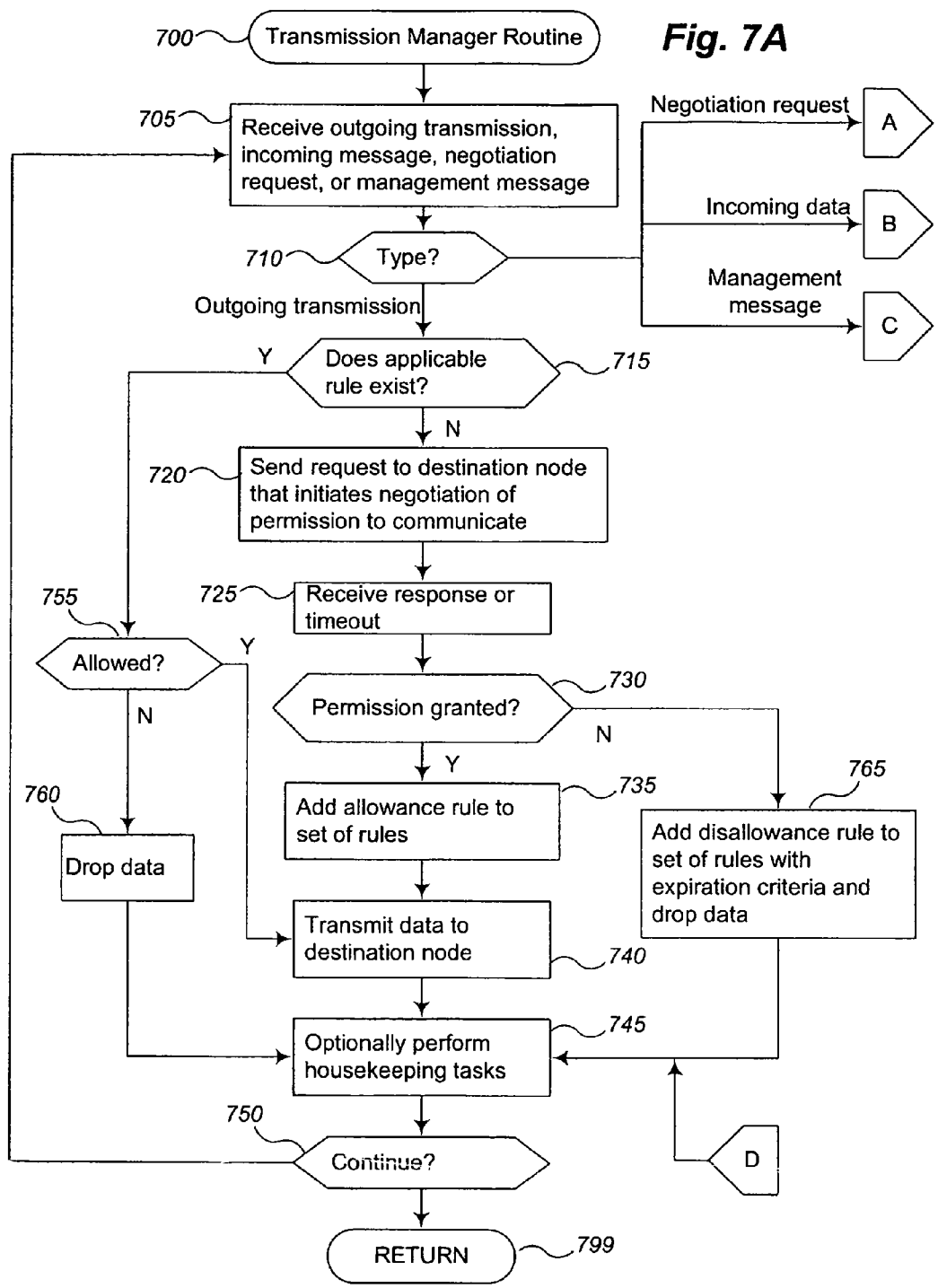
FIGS. 7A-7B illustrate a flow diagram of an example embodiment of a Transmission Manager routine.
Figure 7B:
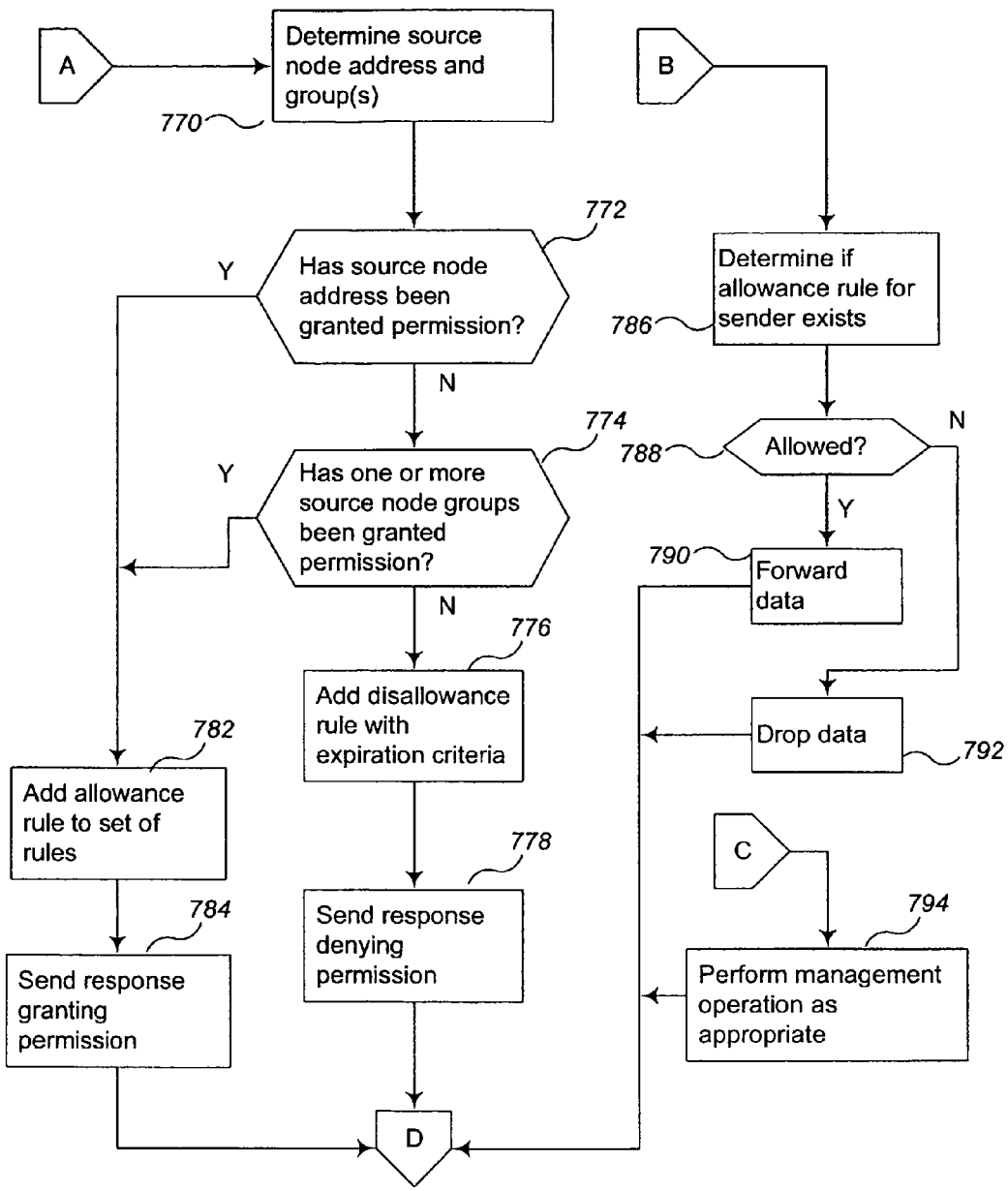

FIGS. 7A-7B illustrate a flow diagram of an example embodiment of a Transmission Manager routine 700. The routine may be provided by execution of, for example, a data transmission manager component, such as DTM 115 or DTM 125 shown in FIG. 1.

The routine begins in step 705 and receives an outgoing transmission, an incoming transmission, a negotiation request, or a management message. The routine then proceeds to step 710 and determines the type of message or request received in step 705. If it is determined in step 710 that the routine has received an indication of an outgoing transmission, the routine proceeds to step 715 to determine whether it has an applicable rule indicating a prior negotiation for authorization. An applicable rule may be one that either allows or denies the transmission from the source node to the destination node indicated by the outgoing transmission. If it is determined that no such rule exists, the routine proceeds to step 720 and initiates a negotiation for authorization by sending a request to the destination node. In the example embodiment, while the request is sent to the destination node, it is intercepted by a remote DTM that manages the destination node (thus allowing the DTM to initiate negotiation without specific knowledge of the network address of the remote DTM), although in other embodiments the negotiation request message may instead be send directly to an appropriate DTM (e.g., via a mapping of destination nodes to the remote DTMs that manage them) or in another manner. Next, the routine proceeds to step 725 to receive either a response or a timeout. A timeout may be received if for some reason the remote DTM has gone offline or is otherwise unreachable. If no response from the remote DTM is received within a predetermined timeout, the lack of response is treated as a response that denies authorization to communicate in this embodiment, although in other embodiments the lack of a response could be treated as an authorization or could trigger additional attempts to negotiate for authorization. The routine then proceeds to step 730 to determine whether authorization has been granted to transmit data from the source to the destination node. If an explicit allowance of authorization was received (e.g. a message containing an indication of authorization), the routine proceeds to step 735 and adds an allowance transmission management rule that authorizes future data transmissions from the source to the destination node. If instead the routine receives an explicit denial of authorization or a timeout, the routine proceeds to step 765 to add a rule indicating a denial of authorization, and drops any data that is received from the source node and bound for the given destination node. In this example, the added denial of authorization rule includes expiration criteria, such as a timeout or expiration date, such as to force renegotiation of data transmission rules on a periodic basis in order to assure that dynamic changes to group memberships, access policies, and/or node network identities will be correctly reflected in the rule sets maintained by various DTMs.

If it is instead determined in step 715 that a rule governing data transmissions from the source node to the destination node does exist, the routine proceeds to step 755 to determine whether the rule authorizes such transmissions. If so, or after step 735, the routine proceeds to step 740 and transmits the data from the source node to the destination node. If it is instead determined in step 755 that the rule denies authorization for data transmissions from the source node to the destination node, the routine proceeds to step 760 and drops any data from the source node that is bound for the given destination node. Note that in embodiments that do not queue and instead discard data received during pending negotiations for authorization, steps such as 725 and 740 may be somewhat simplified. For example, an embodiment that does not queue data while awaiting a response to a negotiation request may not wait to receive a timeout as described with reference to step 725 above, because there will be no accumulation of queued data to either discard or transmit depending on the outcome of the pending negotiation. In addition, in such cases the routine may proceed directly from step 735 to step 745, bypassing step 740, because there will be no data to transmit (since any data that initiated an authorization negotiation would have been discarded rather than queued).

If it is instead determined in step 710 that the routine has received a negotiation request from a remote DTM that is attempting to obtain permission for a source node to communicate with one of the destination nodes managed by the DTM, the routine proceeds to step 770 to determine the source node address and the groups to which the source node belongs. In some embodiments, some or all of information will be provided to the DTM as part of the received negotiation request from the remote DTM. Alternatively, the DTM may acquire some or all of this information in other manners, such as from another system component (e.g., the DTM Group Manager 140 or DTM System Manager 150 of FIG. 1). Next, the routine proceeds to step 772 to determine whether the network address of the source node has been granted authorization to communicate with the destination node. If not, the routine continues to step 774 to determine whether at least one of the source node's groups has been granted permission to communicate with the destination node. If not, the routine continues to step 776 and adds a rule that denies authorization for transmissions from the source node to the destination node which may include expiration criteria to force renegotiation of data transmission rules on a periodic basis. Next, the routine continues to step 778 and sends a response to the remote DTM denying authorization to communicate. If it is instead determined in step 772 or step 774 that the source node has been granted authorization to communicate with the destination node, however, the routine proceeds to step 782 and adds a rule that authorizes communication from the source node to the destination node. Next, the routine proceeds to step 784, where it sends a response to the remote DTM indicating the authorization for the source node to communicate with the destination node.

If it is instead determined in step 710 that the routine has received incoming data, the routine proceeds to step 786. In step 786, the routine determines whether a rule exists in the rule set that authorizes communication from the source node of the incoming data to the destination node of the incoming data. If it is so determined in step 788, the routine continues to step 790 and forwards the data onwards to the final destination node. If no rule exists that denies authorization for such communication, or a rule exists that explicitly denies authorization for such communication, the routine proceeds to step 792 and drops the incoming data. In addition, in some embodiments the DTM may in this case send a message to the remote DTM that originally sent the data that such communication was not permitted, thereby informing the remote DTM that it should invalidate some or all of the rules related to this particular destination node.

If it is instead determined in step 710 that the routine has received a management message, the routine proceeds to step 794. Management messages may include notifications that one or more of the nodes managed by the DTM have gone offline, notifications that a new node to be managed by the DTM has come online, etc. In some embodiments, when a new node comes online, the DTM that manages the new node may determine network location (e.g. network address) of the new node, the groups to which the new node belongs, the source nodes or other senders (individual nodes or groups) that have been granted authorization to communicate with the new node, the particular protocols that senders may use to communicate with the new node, etc. In other embodiments, the DTM may alternatively delay the acquisition of such information until a later time, such as when the new node first sends outbound communication, or when the first inbound communication destined for the new node arrives. Such information may be obtained by the DTM by communicating with other system components such as the DTM Group Manager 140 or the DTM System Manager of FIG. 1, or by reference to network-accessible data stores. Similarly, when a node managed by the DTM goes offline, the DTM may flush any rules from its rule set that reference the node as either a source or a destination node. The DTM may also flush any information related to the network identity, group membership, and/or access policies of the node.

After steps 760, 740, 765, 784, 778, 790, 792 or 794, the routine continues to step 780 to optionally perform housekeeping tasks (e.g., checking the expiration criteria associated with rules stored in a TM component's rule set). In some embodiments rules may be set to expire automatically after a specified time interval. In other embodiments, the DTM periodically examines the rules in the rule set and flushes or deletes those that have reached a certain age. Other housekeeping tasks may include operations such as updating or rotating logs, or handling additional messages or requests not illustrated in the above flowchart. For example, in some cases the above example embodiment of a DTM will have an authorization rule that has gone stale—that is, the authorization rule will make reference to a destination node that has at some point after the initial negotiation of permission gone offline. In such a case, the DTM may not be aware that the destination node has gone offline until one of the source nodes under the management of the DTM attempts to transmit data to that node. Because the DTM has a rule that allows such transmission, the DTM will transmit the data to the destination node. However, the remote DTM will reject the transmission and reply with a message informing the DTM to invalidate the rule that allowed such a transmission (or alternatively all rules that reference the node as a destination node). In response, the DTM will flush some or all stored rules related to the given destination node as appropriate.

After step 745, the routine proceeds to step 750 to determine whether to continue. If so, the routine returns to step 705, and if not continues to step 799 and ends.

Figure 8:
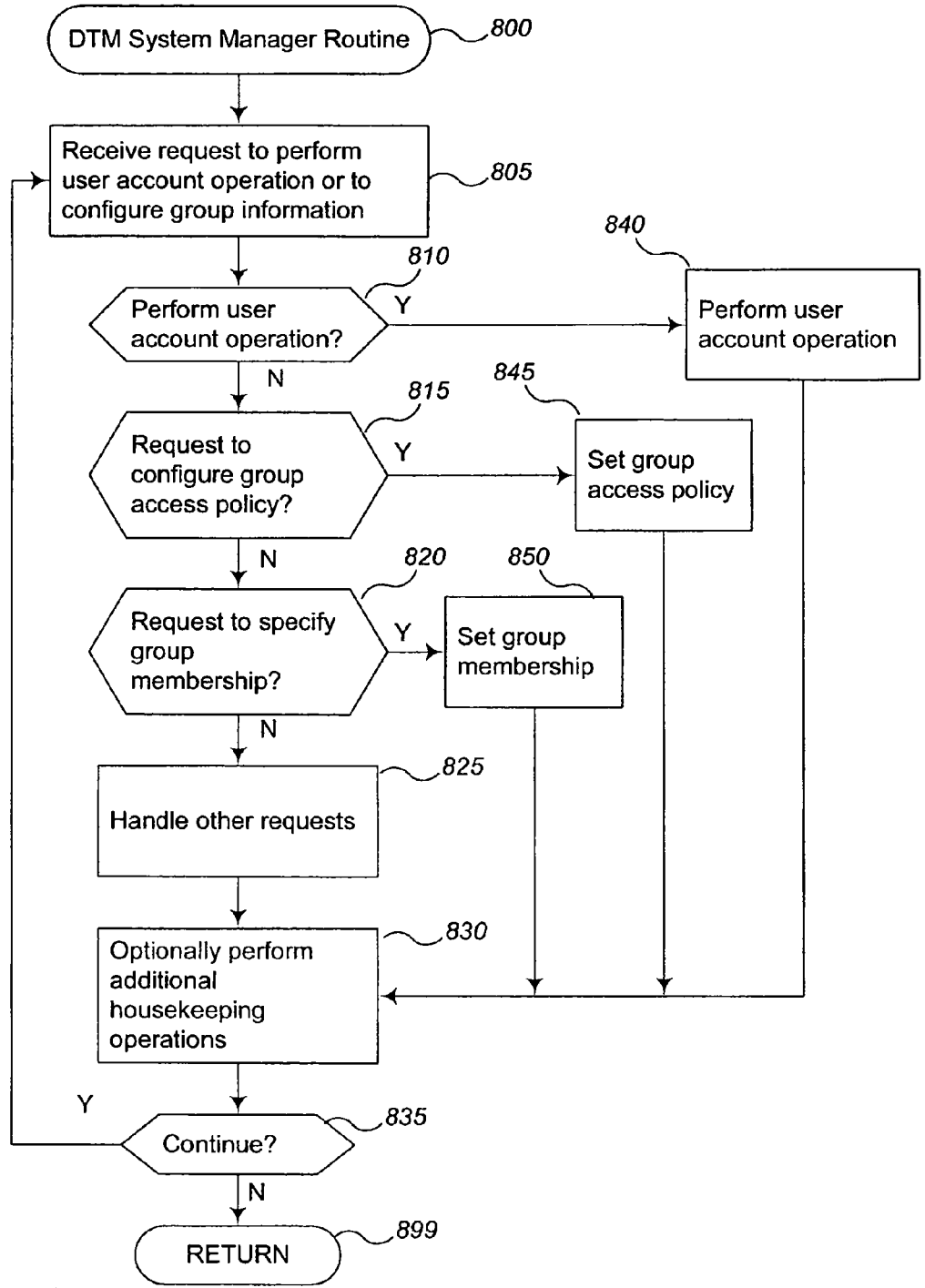
FIG. 8 illustrates a flow diagram of an example embodiment of a DTM System Manager routine.

FIG. 8 illustrates a flow diagram of an example embodiment of a DTM System Manager routine 800. This routine may be provided by execution of, for example, the DTM System Manager 150 shown in FIG. 1. The routine begins in step 805 and receives a request to perform a user account operation or to configure group information. Next, the routine proceeds to step 810 to determine whether it has received a request to perform a user account operation. If so, it proceeds to step 840 and performs the requested user account operation as appropriate (e.g., creation or deletion of user accounts, modifications to user account settings such as billing information, the reservation of computing time or other resources provided by the data center, the provision and management of machine images or application profiles, etc.). If it is not determined that a user account operation has been requested in step 810, the routine continues to step 815 to determine whether it has received a request to configure group access policy. If so, the routine continues to step 845 and sets or otherwise configures a group access policy as requested and as appropriate. These access policies may, for example, resemble those depicted in the table of FIG. 3B. In some cases, the routine may in addition notify some DTMs (e.g., only those that are managing nodes that are affected by the indicated access policy) or all of the DTMs of the indicated access policy. If it is not determined in step 815 that a request to configure a group access policy has been received, the routine proceeds instead to step 820 where it determines whether it has received a request to specify group membership. If so, it continues to step 850 and performs modifications to group membership information as appropriate. In some cases, the routine may in addition notify some DTMs (e.g., only those that are managing nodes that are affected by the group membership specification) or all of the DTMs of the group membership modification. If it is not determined in step 820 that a request to specify group membership has been received, the routine proceeds instead to step 825 to handle other requests. Other requests may include operations such as the creation of new groups, the deletion of groups, modifications to existing groups or user accounts not handled by the steps above, etc. After steps 830, 840, 845, or 850, the routine proceeds to step 830 and optionally performs additional housekeeping operations (e.g., the periodic generation of billing information for users, access and operation logging or log rotation, system backups, or other management or administrative functions). Next, the routine proceeds to step 835 to determine whether to continue. If so, the routine proceeds to step 805 to process additional incoming requests. If not, the routine proceeds to step 899 and returns.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

As previously noted, in some embodiments the initiation of a data transmission or other communication by a computing node may occur and may be identified by an associated data transmission manager component in a variety of ways. In some embodiments, the computing node may send an explicit message to the TM component that manages it requesting permission to communicate with a remote node, while in other embodiments the existence of the TM and the authorization negotiation that it performs may be entirely transparent to the computing node—if so, the computing node simply attempts to send data to the remote node, while the TM component monitors and processes all outgoing transmissions from the computing node. When the TM component identifies an initiated data transmission from the computing node (whether by receiving an explicit request message from the computing node, by detecting an outbound transmission for which it has not already negotiated permission, such as by inspecting the source and destination network addresses of TCP or UDP packets as they flow across a network interface, etc.), the TM components initiates an authorization negotiation if the existence of authorization or an authorization denial does not already exist. While the TM component negotiates authorization, it may queue the outgoing data from the computing node that is bound for the remote destination node and process the data according to the authorization negotiation results (e.g. by allowing or preventing the data transmission to proceed to the destination node), as well as optionally manipulate data before it is forwarded on to the destination node (e.g., to include indications of obtained authorization for use by the destination computing node and/or destination transmission component in verifying authorization and/or authenticity of the data transmissions; to modify the manner in which the data is transmitted, such as to change the data format and/or transmission protocol to reflect preferences of the destination computing node or for other reasons; to modify the data that is transmitted, such as by adding and/or removing data; etc.).

In addition, various embodiments may provide mechanisms for customer users and other users to interact with an embodiment of the DTM system. For example, some embodiments may provide an interactive console (e.g. a client application program providing an interactive user interface, a Web browser-based interface, etc.) from which users can manage the creation or deletion of groups and the specification of communication access policies or group membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In addition, some embodiments may provide an API ("application programming interface") that allows other computing systems and programs to programmatically invoke such functionality. Such APIs may be provided by libraries or class interfaces (e.g., to be invoked by programs written in C, C++, or Java) and/or network service protocols such as via Web services.

In addition, various implementation architectures are possible for embodiments of the DTM system. In some embodiments, multiple TM components may act in a distributed manner to each manage the data transmissions of one or more associated nodes, whether by each operating as an independent autonomous program or by cooperating with other TM components, and may possibly be hosted virtual machines on the same computing system as the nodes being managed or may instead operate on computing systems remote from the nodes that they manage. While authorization negotiations have been described in which TM components interact directly with each other, in other embodiments such TM components may instead negotiate authorizations in other manners, such as by communicating with a central component that manages communication policies for the entire system, or by referencing configuration files or other static information stores that are available locally or over a network. In addition, the authorization negotiation performed by TM components may have a variety of forms. For example, in some embodiments, the actual network address or other identity of a remote TM component may be known to a TM component initiating a negotiation, and if so, that TM component may interact directly with that remote TM component, while in other embodiments the TM component may send information to the network address of the destination computing node with the expectation that the sent information will be intercepted by the appropriate remote TM component. In other embodiments, a single, central TM component or other component may manage the data transmissions for a large number of computing nodes (e.g. an entire data center) if the single component has access to data transmissions initiated by those nodes (whether due to configuration of the nodes or to a network structure or other mechanism that provides such access). In still other embodiments, the functionality of a TM component may be distributed, such as by being incorporated into each of the computing nodes being managed (e.g., by being built into system libraries used for network communications by all of the nodes), or a distinct TM component may operate on behalf of each computing node.

In addition, in embodiments in which the functionality of the DTM system is distributed amongst various system components, various negotiation schemes and protocols are possible. Negotiation requests and other messages related to data transmission policies and permissions that are passed between TM components or between TM components and other system components may be implemented in various manners, such as by sending low-level UDP packets containing the relevant information, or by way of protocols implemented upon higher-level protocols such as HTTP (e.g. XML-RPC, SOAP, etc).

As previously noted, the described techniques may be employed on behalf of numerous computing nodes to provide various benefits to those computing nodes. In addition, such computing nodes may in at least some embodiments further employ additional techniques on their own behalf to provide other capabilities, such as by each configuring and providing their own firewalls for incoming communications, anti-virus protection and protection against other malware, etc.

When the described techniques are used with a group of computing nodes internal to some defined boundary (e.g., nodes within a data center), such as due to an ability to obtain access to the data transmissions initiated by those computing nodes, the described techniques may also in some embodiments be extended to the edge of the defined boundary. Thus, in addition to managing data transmissions between computing nodes within the defined boundary, one or more transmission manager components that may access communications passing through the boundary between internal and external computing nodes may similarly provide at least some of the described techniques for those communications. For example, when a data communication is received at the boundary from an external computing node that is intended for an internal computing node, a transmission manager component associated with the edge may similarly treat the communication as an outgoing data transmission initiated by a managed computing node, such as by queuing the communication and allowing it to be passed into the internal network only if authorization is negotiated and obtained (e.g., by negotiating with a transmission manager component associated with the destination computing node, or instead with a component acting on behalf of all internal computing nodes).

Those skilled in the art will also realize that although in some embodiments the described techniques are employed in the context of a data center housing multiple intercommunicating nodes, other implementation scenarios are also possible. For example, the described techniques may be employed in the context an organization-wide intranet operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to partition virtual machines to reflect almost any situation that would conventionally necessitate physical partitioning of distinct computing systems.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for managing outgoing data transmissions, the method comprising:
   receiving, by a transmission manager associated with a host computing system, an indication of an outgoing transmissions of data being initiated by a virtual machines hosted by the host computing system, the outgoing transmission of data indicating a destination node;
   determining, by the transmission manager, if authorization already exists for transmissions from the virtual machine to the destination node;
   if authorization does not already exist for transmissions from the virtual machine to the destination node, initiating, by the transmission manager, a negotiation for authorization to transmit to the destination node, the initiating including sending a request with information regarding the virtual machine to a recipient associated with the destination node; and
   if the authorization is obtained, transmitting the data to the destination node on behalf of the virtual machine and storing an indication of the obtained authorization for use in authorizing future transmissions of data from the virtual machine to the destination node.

2. The method of claim 1 further comprising:
   if authorization is not obtained, preventing transmitting of the data to the destination node and storing an indication of a lack of authorization for use in preventing authorization for future transmissions of data from the virtual machine to the destination node.

3. The method of claim 2 wherein the determining if authorization already exists for transmissions from the virtual machine to the destination node includes determining that authorization does not already exist if no stored indications exist from a prior initiated transmission from the virtual machine to the destination node, and further comprising:
preventing transmitting of the data to the destination node if it is determined that a stored indication from a prior initiated transmission indicates a lack of authorization for transmissions from the virtual machine to the destination node.

4. The method of claim 2 wherein the stored indication of a lack of authorization includes a created transmission management rule that indicates that future transmissions of data from the virtual machine to the destination node are not authorized.

5. The method of claim 1 wherein the stored indication of obtained authorization includes a created transmission management rule that indicates that future transmissions of data from the virtual machine to the destination node are authorized.

6. The method of claim 5 wherein the stored transmission management rule has an associated expiration time after which the rule is no longer used to determine whether transmissions are authorized.

7. The method of claim 1 wherein the stored indication of the obtained authorization includes an indication that future transmissions of response data from the destination node to the virtual machine are authorized.

8. The method of claim 1 further comprising: after the authorization is obtained for an initiated transmission of data from the virtual machine to the destination node, receiving an indication of one or more additional transmissions of data from the virtual machine to the destination node and allowing the additional transmissions to occur based on the obtained authorization.

9. The method of claim 8 further comprising:
after the authorization is obtained for an initiated transmission of data from the virtual machine to the destination node, receiving an indication of an additional transmission of data from the virtual machine to a second destination nodes and preventing the additional transmissions of data from being sent to the second destination nodes while initiating a request to attempt to obtain authorization for the additional transmissions.

10. The method of claim 1 wherein the sent request that initiates the negotiation for authorization includes an indication of a network address of the virtual machine, and wherein authorization for the transmission is based at least in part on the indicated network address being permitted to communicate with the destination node.

11. The method of claim 1 wherein the sent request includes an indication of a group of which the virtual machine is a member.

12. The method of claim 11 wherein the group includes multiple virtual machine node members that are each authorized to communicate with the other members of the group.

13. The method of claim 11 wherein the group includes multiple virtual machine node members that are all authorized to communicate with one or more other virtual machine nodes.

14. The method of claim 11 further comprising:
receiving an indication that the virtual machine is a member of a node group.

15. The method of claim 14 further comprising:
receiving a request with information regarding a remote node that has initiated a transmission to the virtual machine, and responding with an indication of whether the transmission to the virtual machine is authorized based at least in part on the node group of which the virtual machine node is a member.

16. The method of claim 15 further comprising:
if the transmission to the virtual machine from the remote node is authorized, storing an indication for use in automatically authorizing future transmissions of data from the remote node to the virtual machine.

17. The method of claim 1 wherein the virtual machine is one of a plurality of virtual machines, the method further comprising:
partitioning at least some of the plurality of virtual machines into at least a first node group and a second node group, each group having multiple virtual machine members such that none of the virtual machine members of the first node group are also members of the second node group.

18. The method of claim 17 wherein the multiple virtual machine members of the first node group are used for one of software development, software testing, or software deployment, and wherein the multiple virtual machine members of the second node group are used for another of software development, software testing, or software deployment.

19. The method of claim 17 wherein the multiple virtual machine members of the first node group are used to provide a first type of application and the multiple virtual machine members of the second node group are used to provide a distinct second type of application, and wherein the members of the first node group interoperate with the members of the second node group to provide a multi-tiered business application.

20. The method of claim 17 wherein the multiple virtual machine members of the first node group are utilized by a first structural subset of an organization and the multiple virtual machine members of the second node group are utilized by a distinct second structural subset of the organization.

21. The method of claim 1 further comprising receiving one or more definitions of groups from a service that provides use of one or more applications to multiple customers, and wherein the service assigns a distinct group to each of its multiple customers.

22. The method of claim 1 wherein the virtual machine is one of multiple virtual machines, wherein at least some of the multiple virtual machines each belong to one or more groups of nodes, wherein the negotiation for authorization is based at least in part on groups to which the virtual machine and the destination node belong, and wherein the method further comprises:
modifying the groups of nodes based on one or more received indications of group management operations, each indicated group management operation being one of an instruction to create a new group, an instruction to delete an existing group, or an instruction to change the members of an existing group.

23. The method of claim 11 wherein the negotiation for authorization is further based at least in part on access policies associated with the groups to which the virtual machine and destination node belong, and wherein the method further comprises:
modifying access policies associated with groups based on one or more received indications of access policies, each indicated access policy including a specification of conditions under which members of a first group are authorized to communicate with members of a second group.

24. The method of claim 1 wherein the sent request includes an indication of one or more groups of nodes with which the virtual machine is authorized to communicate.

25. The method of claim 1 wherein the received indication of the outgoing data transmission includes one or more data packets addressed to the destination node that are sent from the virtual machine.

26. The method of claim 25 wherein the receiving of the indication of the outgoing data transmission includes intercepting the data packets sent by the virtual machine and discarding the data packets if authorization does not already exist for transmissions from the virtual machine to the destination node.

27. The method of claim 25 wherein the receiving of the indication of the outgoing data transmission includes intercepting the data packets sent by the virtual machine, and wherein the method further comprises queuing the data packets during the initiated negotiation for authorization.

28. The method of claim 1 wherein the request that initiates negotiation is sent to a computing system that hosts the destination node.

29. The method of claim 28 wherein the request sent to the computing system that hosts the destination node is addressed to the destination node and is intercepted by the computing system that hosts the destination node.

30. The method of claim 1 wherein the data transmission includes a request to access a network service provided by the destination node.

31. The method of claim 1 wherein the virtual machine initiating the outgoing data transmission is a first virtual machine, and wherein the method is performed by a traffic manager program executing on a distinct second virtual machine hosted by the host computing system.

32. The method of claim 31 wherein the distinct second virtual machine is a privileged virtual machine via which transmissions pass to and from the first virtual machine.

33. The method of claim 31 wherein request that initiates negotiation is received by a second traffic manager program executing as part of a hosted distinct third virtual machine hosted by a computing system that also hosts the destination node, and further comprising:
under control of the traffic manager program that receives the request,
determining whether the first virtual machine is authorized to perform the transmission of data to the destination node, and
sending a reply indicating that authorization is provided if the first virtual machine is determined to be authorized.

34. The method of claim 1 further comprising:
in response to receiving an indication that the virtual machine has been terminated, removing all stored indications of authorizations for the virtual machine.

35. The method of claim 1 further comprising:
storing an indication that disallows transmission of data from the virtual machine if a volume of data transmitted by the virtual machine exceeds a predetermined threshold.

36. A non-transitory computer-readable medium whose contents configure a computing device to manage data transmissions for a node, by performing a method comprising:
receiving an indication of an outgoing transmission of data being initiated by a virtual machine hosted by the computing device, the outgoing transmission of data indicating a destination node;
determining if authorization already exists for transmissions from the virtual machine to the destination node;
if authorization does not already exist for transmissions from the virtual machine to the destination node, initiating a negotiation for authorization to transmit to the destination node, the initiating including sending a request with information regarding the virtual machine to a recipient associated with the destination node; and
if the authorization is obtained, transmitting the data to the destination node on behalf of the virtual machine and storing an indication of the obtained authorization for use in authorizing future transmissions of data from the virtual machine to the destination node.

37. The non-transitory computer-readable medium of claim 36 wherein the virtual machine initiating the outgoing transmission is a first virtual machine, wherein the method is performed by a first node on the configured computing device that is distinct from the first virtual machine and distinct from the destination node and that is associated with multiple nodes including the first virtual machine, wherein the destination node is a second virtual machine hosted by another computing device that is associated with multiple nodes including the destination node, and wherein the method further comprises, if the negotiated authorization is obtained, storing a transmission management rule that will allow future transmission of data from the first virtual machine to the destination node without negotiation, and if the negotiated authorization is not obtained, continuing to prevent the data from being transmitted to the destination node.

38. The non-transitory computer-readable medium of claim 36 wherein the configured computing device is a host computing system on which multiple virtual machine nodes execute, wherein the virtual machine initiating the outgoing transmission is a first of the multiple virtual machine nodes, wherein the destination node is one of multiple other virtual machines executing on another host computing system, and wherein the receiving of the indication of the data transmission and the preventing of the data from being transmitted to the destination node includes intercepting the data transmission to the destination node.

39. The non-transitory computer-readable medium of claim 36 wherein the computer-readable medium is a memory of the configured computing device.

40. The non-transitory computer-readable medium of claim 36 wherein the contents are instructions that when executed program the configured computing device to perform the method.

41. A computing system comprising:
a processor; and
a memory including instructions that upon execution cause the computer system to
host multiple virtual machines that are each configured to execute at least one application program in a portion of the memory allocated to that virtual machine; and
execute, on a first of the multiple virtual machines, a transmission manager that is configured to manage data transmissions from the other of the hosted virtual machines, the managing of the data transmissions including:
detecting an indication of a data transmission sent from one of the other hosted virtual machines to a destination computing node;
preventing the data transmission until authorization is obtained for the one other hosted virtual machine to send the indicated data transmission to the destination computing node;

sending a request to the destination computing node for the authorization; and after receiving a reply indicating the authorization, allowing the data transmission to be sent to the destination computing node from the one other hosted virtual machine.

42. The computing system of claim 41 wherein the transmission manager is further configured to:

after receiving the reply indicating the authorization for the one other hosted virtual machine, store a transmission management rule to authorize future transmissions of data from the one other hosted virtual machine the destination computing node, and after receiving a reply indicating a denial of authorization for a second other hosted virtual machine to send a data transmission to a second destination computing node, store a transmission management rule to indicate a lack of authorization for future transmission of data from the second other hosted virtual machine to the second destination node.

43. The computing system of claim 41 wherein the destination computing node is a virtual machine hosted on a remote host computing system, and wherein the request for authorization sent to the destination computing node is intercepted by another virtual machine computing node hosted on the remote host computing system to manage data transmissions involving the destination computing node, the another virtual machine computing node being configured to reply to intercepted requests for authorization on behalf of the destination computing node.

44. The computing system of claim 41 wherein the first virtual machine is a data transmission manager.

45. The computing system of claim 41 wherein each of the multiple virtual machines hosted on the computing system has a distinct network address.

46. The computing system of claim 41 wherein the first virtual machine is configured to manage data transmissions from the other hosted virtual machines by detecting indications of transmissions of data sent from the other hosted virtual machines to destination computing nodes that are not hosted by the computing system, and by, for each detected indication of a data transmission sent by one of the other hosted virtual machines to a destination computing node, preventing the data transmission until authorization is obtained for the one other hosted virtual machine to send the indicated data transmission to the destination computing node, sending a request to the destination computing node for the authorization, and allowing one or more data transmissions to be sent to the destination computing node from the one other hosted virtual machine after receiving a reply indicating the authorization.

* * * * *

UNITED STATES PATENT AND TRADEMARK OFFICE
CERTIFICATE OF CORRECTION

PATENT NO.        : 8,509,231 B2                                        Page 1 of 2
APPLICATION NO.   : 12/859098
DATED             : August 13, 2013
INVENTOR(S)       : Quinton R. Hoole et al.

It is certified that error appears in the above-identified patent and that said Letters Patent is hereby corrected as shown below:

On the Title Page

Item (56):
""Scalable Trust of Next Generation Management (Strongman)," retrieved May 17, 2006, from http://www.cis.upenn.edu/~dsl/STRONGMAN/, 4 pages." should read, --"Scalable Trust of Next Generation Management (STRONGMAN)," retrieved May 17, 2006, from http://www.cis.upenn.edu/~dsl/STRONGMAN/, 4 pages.--.

Item (56):
"Joseph, Joshy, et al., "Introduction to Grid Computing," April 16, 2004, retrieved August 30, 2007, from http://www.informit.com/ar-ticles/printerfriendly.aspx?p=169508, 19 pages." should read, --Joseph, Joshy, et al., "Introduction to Grid Computing," April 16, 2004, retrieved August 30, 2007, from http://www.informit.com/articles/printerfriendly.aspx?p=169508, 19 pages.--.

In the Claims

Column 20, Lines 46-48:
"transmissions of data being initiated by a virtual machines hosted by the host computing system, the outgoing transmission of data indicating a destination node;" should read, --transmission of data being initiated by a virtual machine hosted by the host computing system, the outgoing transmission of data indicating a destination node;--.

Column 21, Lines 32-33:
"8. The method of claim 1 further comprising: after the authorization is obtained for an initiated transmission of data" should read,
--8. The method of claim 1 further comprising:
after the authorization is obtained for an initiated transmission of data.--.

Signed and Sealed this
Eleventh Day of March, 2014

Michelle K. Lee
*Deputy Director of the United States Patent and Trademark Office*

Column 21, Line 37:
"the additional transmissions to occur based on the obtained" should read, --the additional transmission to occur based on the obtained--.

Column 21, Lines 44-47:
"destination nodes and preventing the additional transmissions of data from being sent to the second destination nodes while initiating a request to attempt to obtain authorization for the additional transmissions." should read, --destination node and preventing the additional transmission of data from being sent to the second destination node while initiating a request to attempt to obtain authorization for the additional transmission.--.

Column 22, Line 59:
"23. The method of claim 11 wherein the negotiation for" should read, --23. The method of claim 22 wherein the negotiation for--.

Column 23, Line 39:
"33. The method of claim 31 wherein request that initiates" should read, --33. The method of claim 31 wherein the request that initiates--.

Column 25, Lines 12-13:
"data from the one other hosted virtual machine the destination computing node, and" should read, --data from the one other hosted virtual machine to the destination computing node, and--.